United States Patent

[11] 3,538,967

| [72] | Inventor | James L. Hensley |
| | | Knoxville, Tennessee |
| [21] | Appl. No. | 732,723 |
| [22] | Filed | May 28, 1968 |
| [73] | Assignee | The Carborundum Company |
| | | Niagara Falls, New York |
| | | a corporation of Delaware |

[54] SAWING APPARATUS
3 Claims, 11 Drawing Figs.

[52] U.S. Cl. ................................... 144/318;
29/418; 143/47; 144/3, 144/326
[51] Int. Cl. ..................................... B27f 5/12
[50] Field of Search ........................... 29/418;
144/3, 2; 309; 2-1, 313; 2-2, 314; 2-3, 318; 2-11;
321—323, 326; 143/47, 47-1, 47-2, 47-3, 47-4,
47-8, 47-8.1

[56] References Cited
UNITED STATES PATENTS

| 668,771 | 2/1901 | Butler et al. ................ | 143/47 |
| 834,206 | 10/1906 | Kantner ...................... | 143/47 |
| 2,211,082 | 8/1940 | Smith ......................... | 143/47 |
| 2,819,743 | 1/1958 | Birkel et al. ................ | 143/48 |
| 2,973,020 | 2/1961 | Bennett ...................... | 143/47 |
| 2,992,662 | 7/1961 | Heffern ...................... | 143/47 |
| 3,122,183 | 2/1964 | Striebig ..................... | 143/47 |

Primary Examiner—Gerald A. Dost
Attorney—K. W. Brownell

ABSTRACT: Method and apparatus for cutting door openings and similar panel structures having angular corners. The sides of the panel opening are plunge cut by a circular saw blade or wheel from the front side of the panel leaving a connecting portion at the corners. Hinges or other hardware may then be installed and the panel is turned over. The corners are cut by the saw wheel from the back to remove the connecting portion and thereby severing the panel section that is encircled by the saw cut. The severed panel section serves as a door to conserve panel material.

Patented Nov. 10, 1970

INVENTOR.
JAMES L. HENSLEY
BY
K.W. Brownell

INVENTOR.
JAMES L. HENSLEY
BY
K.W. Brownell

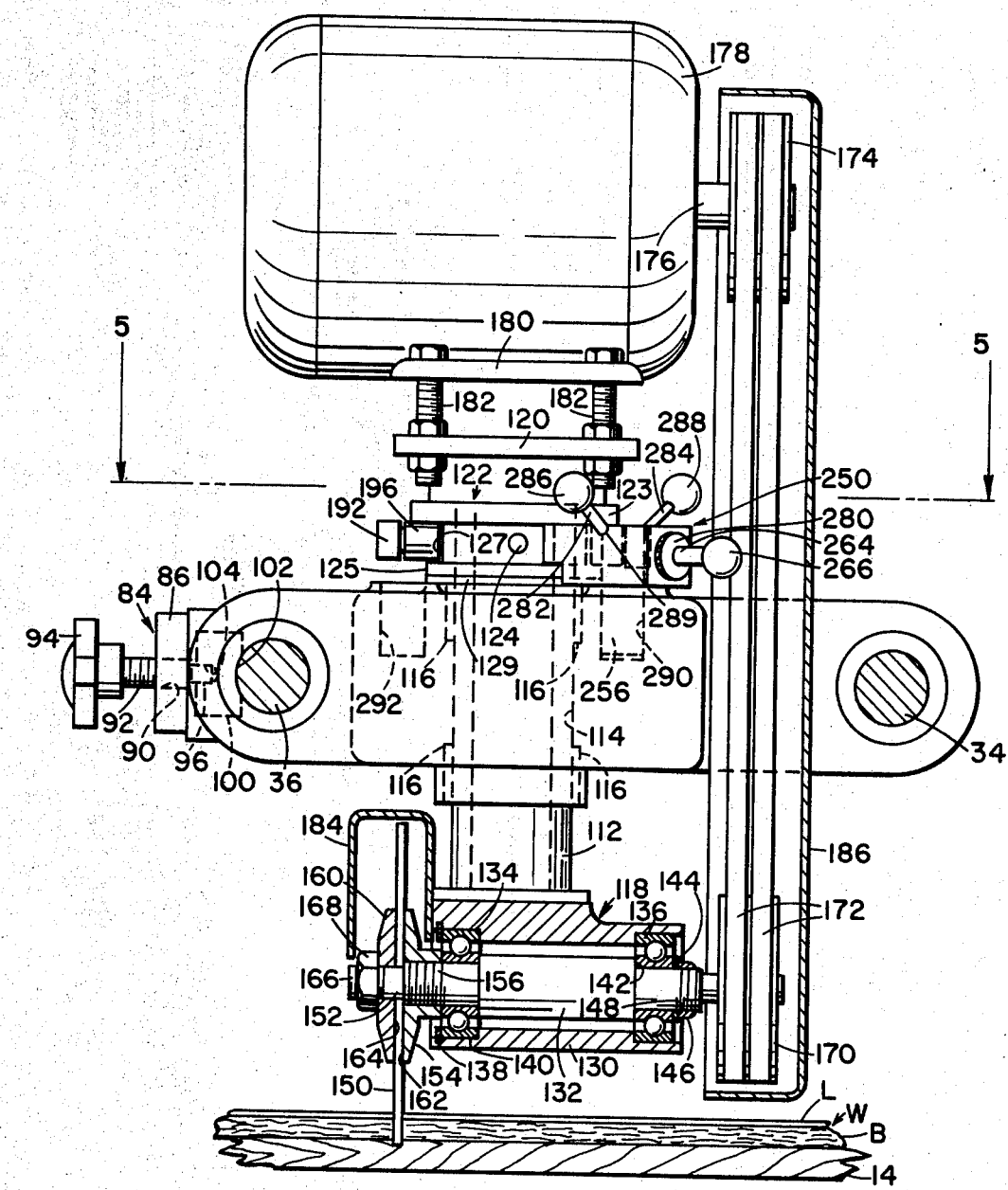
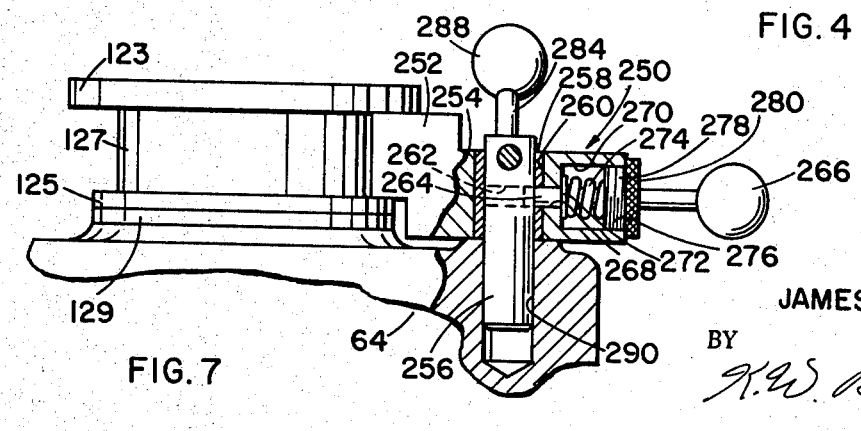
FIG. 4
FIG. 7
INVENTOR.
JAMES L. HENSLEY
BY
K.W. Brownell

INVENTOR.
JAMES L. HENSLEY
BY
R.W. Brownell

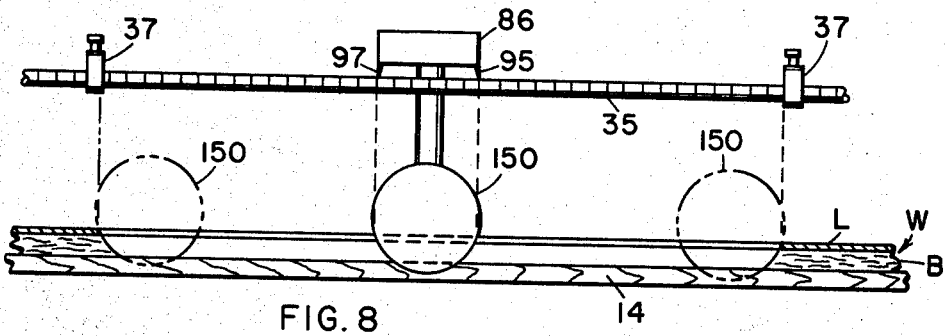
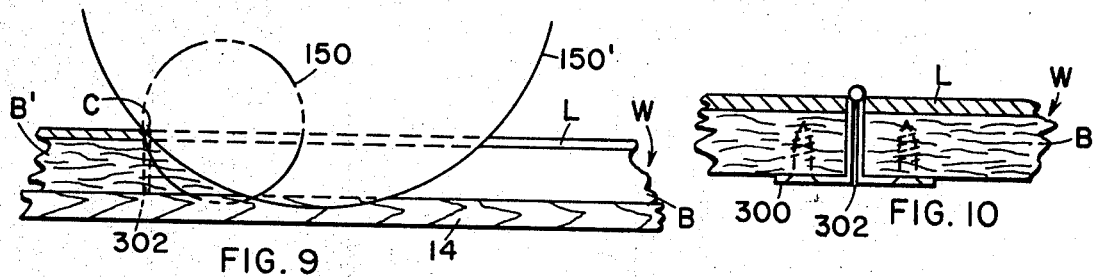
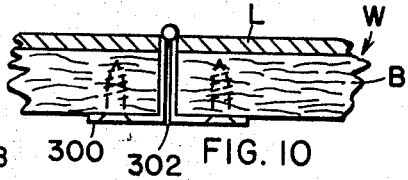
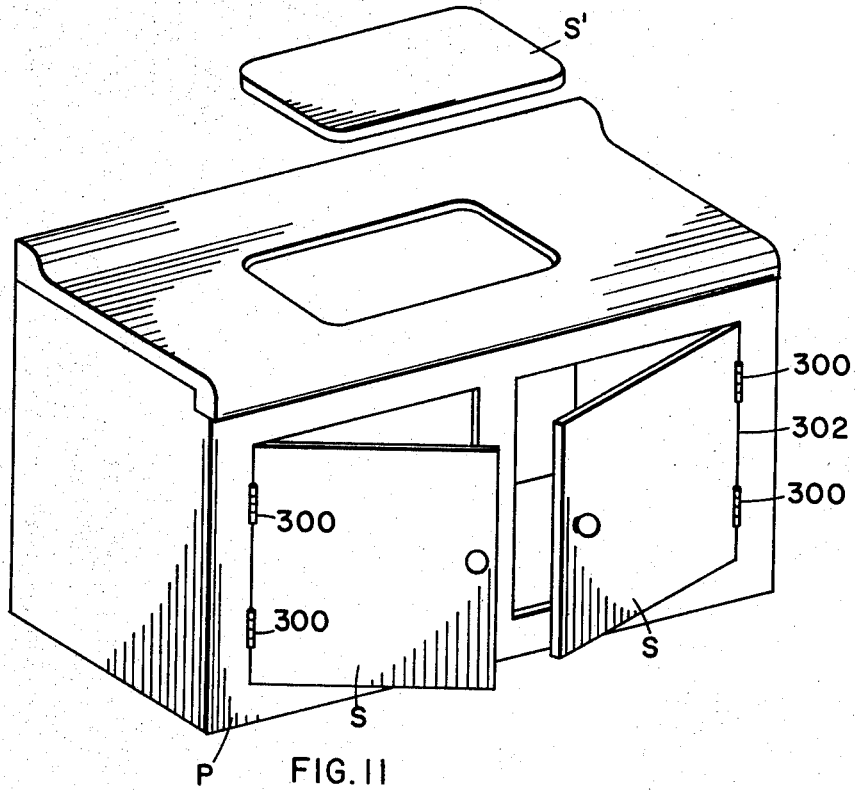
INVENTOR.
JAMES L. HENSLEY 3,538,967

1

SAWING APPARATUS

BACKGROUND OF THE INVENTION

This invention relates to a sawing apparatus and, more particularly, to a sawing apparatus of the character used for producing cuts in laminated structures in a longitudinal and transverse direction to form square corners in a finished product. Although the present invention has utility in many applications, it will be convenient to refer specifically to its use in association with forming cutouts in cabinets of laminated structures, such as sink cabinets by way of example.

Certain species of laminates, such as Formica* and Micarta* for example, have a pleasing surface appearance while being durable and stain resistant, but are relatively expensive. Accordingly, it has been a common practice in some areas of the furniture and appliance industries to apply a thin sheet of such a laminate to a core made of relatively inexpensive backing material such as wood or a fibrous material. The use of laminated sink tops, for example, is conventionally accepted. Conventional apparatus for cutting sink openings in the sink tops functions effectively since the sink cutout portion is scrapped. The use of this laminated material for the front and sides of the sink cabinet, however, has been limited due to the cost of the material wasted in scrapping the cutout sections for the doors and shelf fronts, and the time-consuming labor in accurately fitting said doors and shelves within said cutout sections. These and other deficiencies experienced with the prior known devices have been obviated in a novel manner by the present invention.

It is, therefore, an object of the present invention to provide a new and improved sawing apparatus.

It is another object of the present invention to provide a new and improved sawing apparatus for forming accurate cuts perpendicular to each other.

It is a further object of the present invention to provide a new and improved sawing apparatus having means for pivoting a saw 90° and locking the same in the selected position.

It is still another object of the present invention to provide a new and improved sawing apparatus and method for accurately cutting square corners of openings in panels and utilizing the severed panel sections as closures.

It is still a further object of the present invention to provide a new and improved sawing apparatus which is simple and strong in its construction, rapid and efficient in its operation, and rugged and durable in use.

SUMMARY OF THE INVENTION

These objects are accomplished in accordance with a preferred embodiment of the invention by sawing apparatus having a horizontal work-supporting table over which a rotary saw blade is mounted. The saw blade is mounted for rotation on a carriage that is suspended from a frame that is movable longitudinally of the table. The carriage is also movable transversely of the table along the frame. The motor and saw are supported as a unit on the carriage by a vertical shaft. The vertical position of the unit relative to the carriage and the table is adjustable for making the plunge cut in the workpiece and a lock temporarily holds the saw blade at a predetermined cutting depth. The vertical shaft rotates about its axis to position the saw blade for making cuts in the workpiece at predetermined angles in a horizontal plane.

A laminated panel is placed on the table and the saw blade is positioned for making all of the transverse cuts for the openings in the panel. After the transverse cuts have been made, the vertical shaft on the carriage is rotated and locked in position for making the longitudinal cuts in the panel. After the cuts in the front side of the panel have been made, the panel sections that are encircled by the saw kerfs are connected to the remainder of the panel at the corners. The entire panel is then turned over and these connecting portions are severed by the saw. The separated panel sections have same shape and size as the openings, allowing for clearance. A panel section can be used as a door when secured by hinges along one side of the corresponding opening.

2

DESCRIPTION OF THE DRAWINGS

This preferred embodiment of the invention is illustrated in the accompanying drawings in which:

FIG. 4 is an enlarged cross-sectional view, along the line 4–4 in FIG. 2, illustrating the saw blade, the drive means for the saw blade, and the mounting means therefor;

FIG. 7 is a fragmentary view, partially in section, of the means for pivoting and locking the saw blade, along the line 7–7 of FIG. 5;

FIG. 8 is a schematic view of the system for indicating the leading cutting edge of the saw blade in either direction;

FIG. 9 is a schematic view of the saw blade and the laminated panel showing the kerf profile at a corner;

FIG. 10 illustrates a cut section secured to an adjacent section of a workpiece panel by means of hinges; and FIG. 11 is a perspective view of an exemplary product comprising a top and side panels of laminated sheets.

DESCRIPTION OF THE PREFERRED EMBODIMENTS

Figure 1:
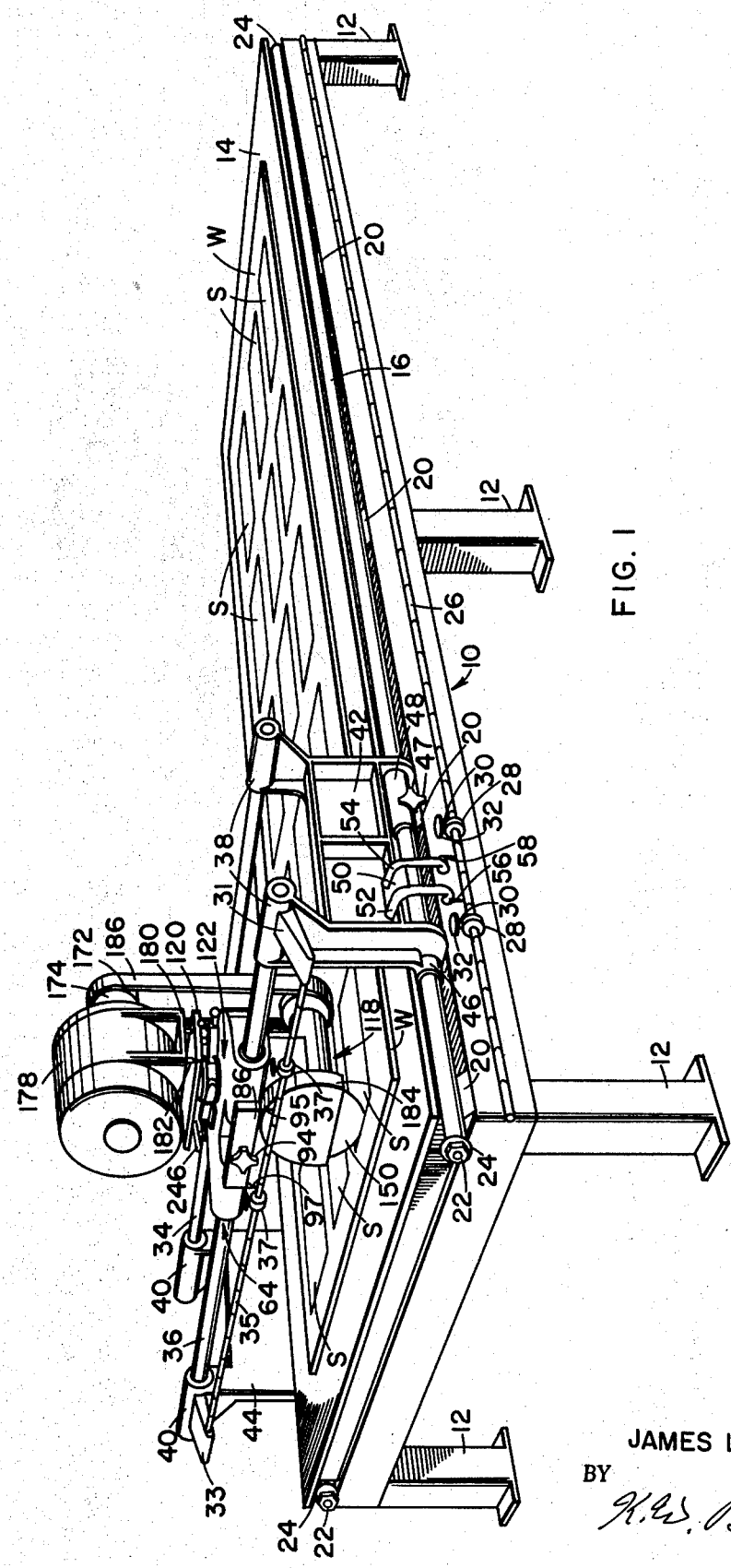
FIG. 1 is a perspective view of a sawing apparatus constructed in accordance with the principles of this invention.
Figure 2:
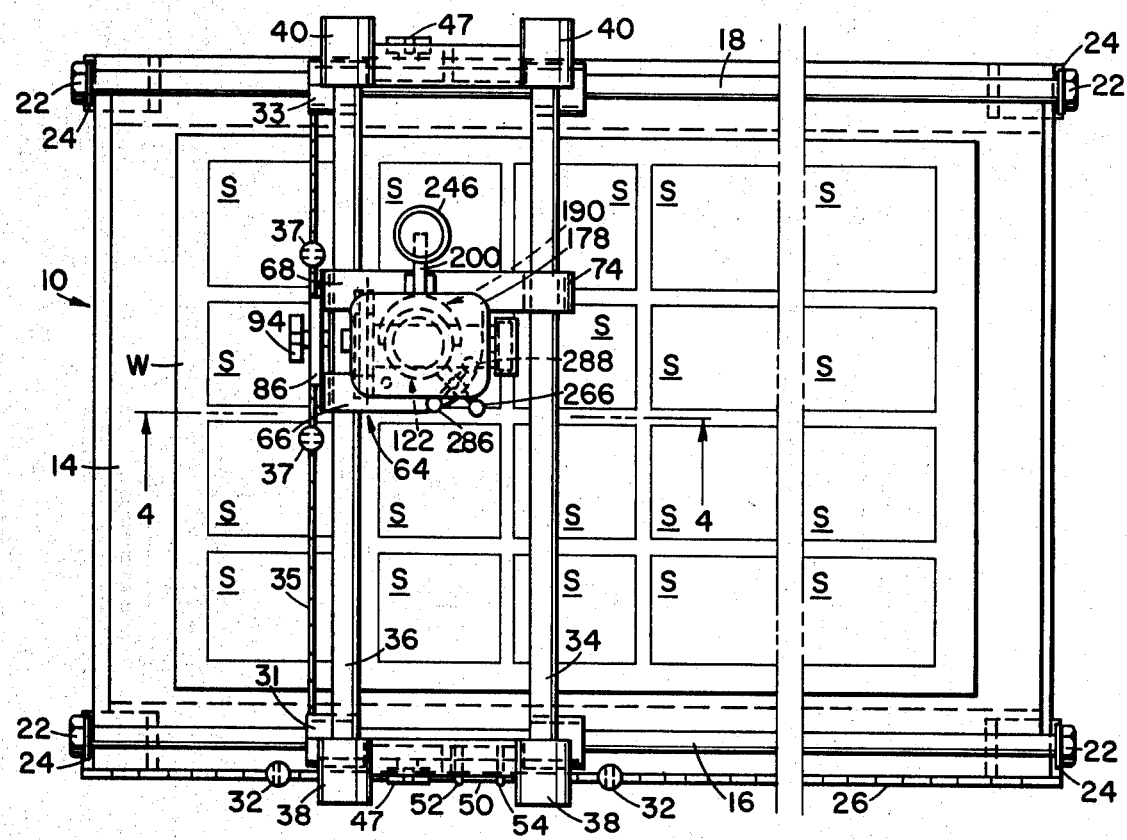
FIG. 2 is a plan view of the sawing apparatus of FIG. 1.

With reference to FIG. 1 of the drawings, it will be seen that a sawing apparatus constructed in accordance with the principles of this invention comprises an elongated, horizontal worktable, generally designated 10, suitably supported on upright standards or pedestals 12. A thin, elongated, substantially rectangular work support 14, preferably made of wood, is secured on the top surface of the worktable for supporting a workpiece W. The front surface of the workpiece W is marked to show the location of saw cuts to cut out panel sections indicated at S.

A pair of elongated guides or tram rods 16 and 18, each having brackets 20 dependent therefrom are disposed along the sides of worktable 10 and are rigidly secured to the frame of said worktable, as by means of welding for example. Bolts 22 are releasably threaded into internally threaded portions of rods 16 and 18 located adjacent both ends thereof, said bolts having washers 24 of a greater diameter than the rods abutting the opposite ends of rods 16 and 18.

An elongated measuring bar 26 having a linear scale thereon is suitably secured to the right side of worktable 10 as shown in FIG. 1. A pair of similarly constructed stop members 28 are slideably mounted on measuring bar 26 and may be fixed in position by means of setscrews 30 having knobs 32 for turning the screws by hand.

A pair of spaced, parallel, elongated carriage shafts 34 and 36 are disposed transversely of the worktable and are suitably rigidly secured at their opposite ends within sleeves 38 and 40, respectively, which in turn are integral with vertically disposed brackets 42 and 44 dependent from the sleeves 38 and 40, respectively. The forward sleeves 38 and 40 have integral lugs 31 and 33, respectively, extending forwardly therefrom, between which is secured a measuring bar 35 having a linear scale thereon with a pair of stop members 37 adjustably mounted along said measuring bar in a construction and manner similar to that of stop members 28. The lower portions of brackets 42 and 44 are each provided with sleeves 46 and 48 which are telescopically received about tram rods 16 and 18 for sliding movement along the rods between the washers 24. A pair of setscrews 47 having hand knobs thereon are provided on sleeves 48, respectively, for releasably securing the same at a selected position along tram rods 16 and 18.

It should be appreciated that the terms forwardly, rearwardly, upwardly, downwardly, longitudinally, transversely, right side, left side and the like as used herein are generally referenced to FIG. 1 and are applied only for convenience of description and should not be taken as limiting the scope of this invention.

Suitably secured to bracket 42 is gauging member 50 having a pair of spaced legs 52 and 54 extending downwardly therefrom having pointers 56 and 58, respectively, for indicating the leading edge of the saw blade in either cutting direction as hereinafter more fully explained.

Figure 5:
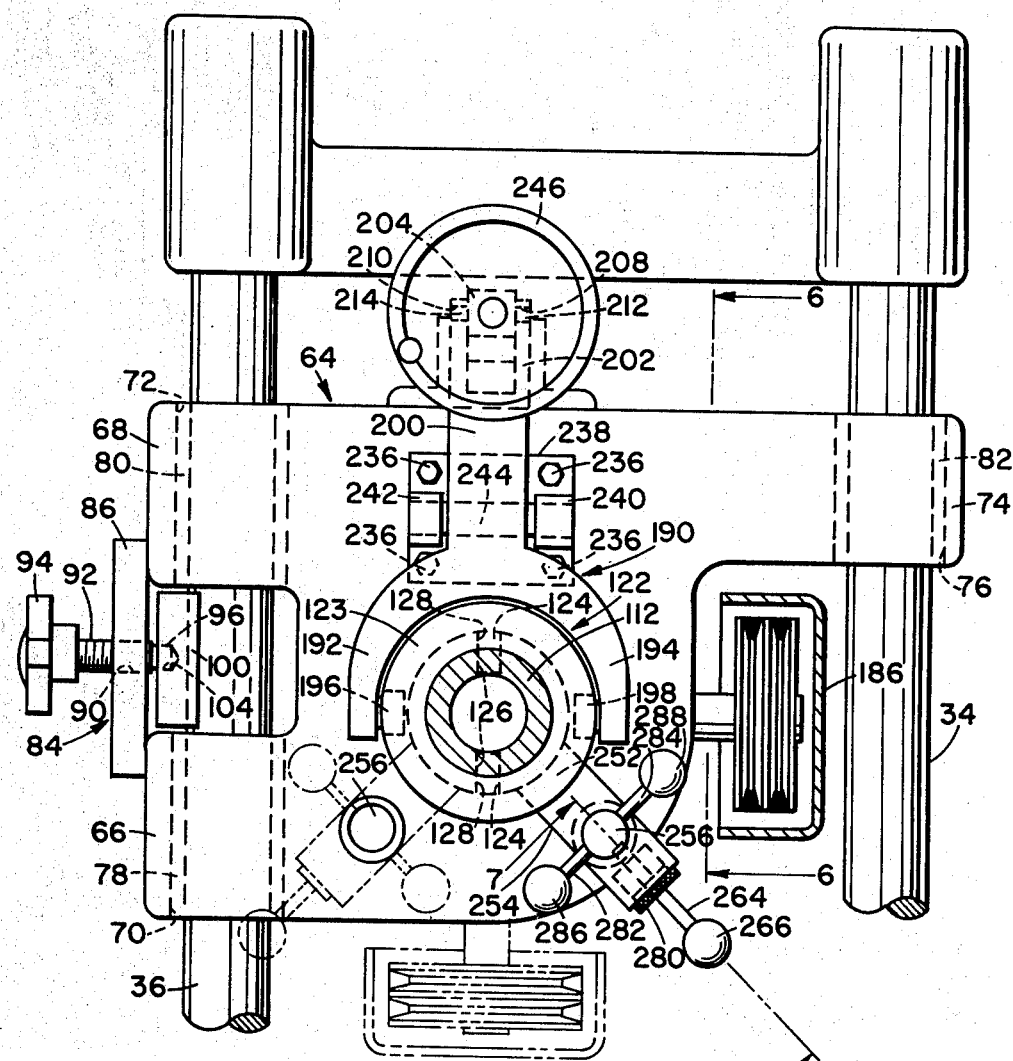
FIG. 5 is a horizontal sectional view along line 5–5 of FIG. 4.

The work-sawing assembly of the present invention is mounted to ride on carriage shafts 34 and 36 transversely of the worktable. This assembly comprises a carriage, generally designated 64, having a pair of spaced extensions 66 and 68 on the left side of the carriage as shown in FIG. 5 and provided with bores 70 and 72 for receiving bushings 78 and 80, respectively. The opposite side of the carriage is provided with an extension 74 having a bore 76 parallel to the bores 70, 72 for receiving a bushing 82. Thus, the carriage is slideably mounted for movement along the shafts 34 and 36.

Figure 3:
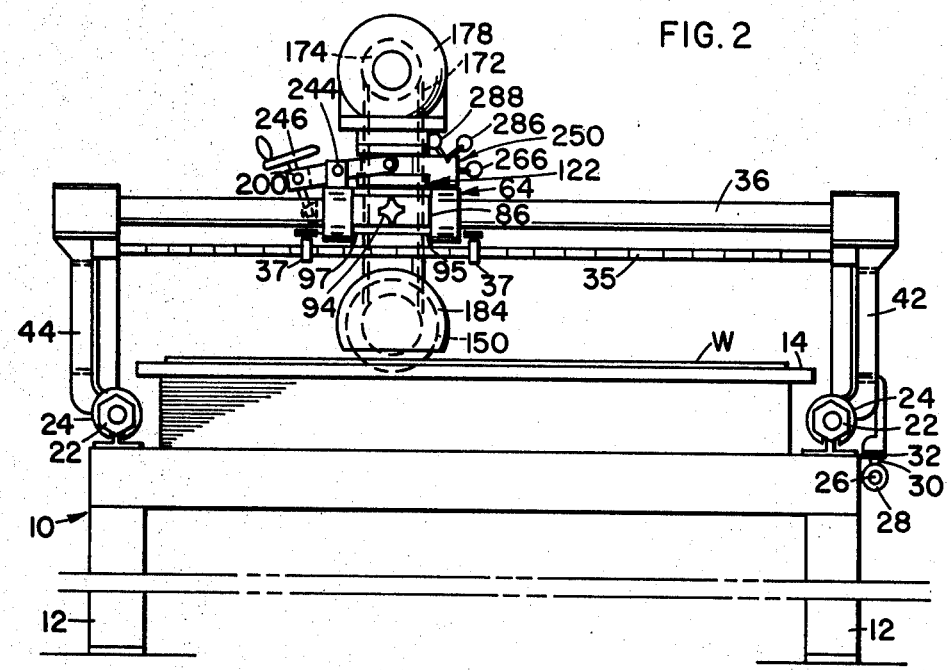
FIG. 3 is a front elevational view of the sawing apparatus of FIG. 1.

Means are provided to secure the carriage 64 temporarily in position along the shafts 34 and 36, such means comprising a locking device, generally designated at 84, having an elongated plate 86 which overlaps the space between extensions 66 and 68 and is rigidly secured to the outer end portions of said extensions by any suitable means, such as welding for example. Plate 86 is provided with an internally threaded bore 90 for receiving an externally threaded screw 92 having a hand-manipulated knob 94 disposed at one end thereof and a reduced diameter stem portion 96 at the other end. A pair of spaced pointers 95 and 97 (see FIGS. 3 and 8) extend downwardly from either end of plate 86 for indicating the leading edge of the saw blade in either transverse cutting direction. Pointers 95 and 97 can be slideably mounted on plate 86 for adjusting the space therebetween to correspond to the diameters of saw blades of various sizes within the purview of the present invention. The pointers are spaced apart a distance equal to the length of cut produced by the blade at the maximum depth of penetration into the workpiece W. This distance may be described as the effective cutting chord length of the circular saw blade.

Confined within the space of extension 66 and 68 is a lock plate 100 having one side surface provided with an arcuate surface 102 (see FIGS. 4 and 5) complimentary to the outer cylindrical surface of carriage shaft 36, the other side being provided with an aperture 104 for accommodating the reduced diameter stem portion 96 of screw 92. By means of the above-described locking mechanism, it can be readily seen that the carriage 64 can be fixed at any position along carriage shafts 34 and 36 or permitted to move therealong, as desired.

An elongated vertically extending tubular post or hollow shaft 112 on the carriage 64 is rotatably mounted within a bore 114 of carriage 64 by means of bushings 116. Shaft 112 is suitably rigidly secured at its bottom end to a spindle assembly, generally indicated 118, as by means of welding for example, and is rigidly secured at its top end to a motor mounting plate 120 by any suitable means.

Shaft 112 is encircled by and secured to a collar, generally indicated 122, having a pair of annular flanges 123 and 125 defining a groove 127 (FIG. 7). A pair of diametrically opposed dowel pins 124 are suitably disposed in aligned apertures 126 and 128 in shaft 112 and groove 127 of collar 122, respectively. Thus, shaft 112 and collar 122 are connected for rotatable movement in unison about a vertical axis. A thrust washer 129 encircles shaft 112 and is sandwiched between flange 125 of collar 122 and carriage 64 to support the weight of the motor and spindle assembly 118.

Referring to FIG. 4, it will be observed that the spindle assembly 118 comprises a spindle housing 130 having a spindle shaft 132 journaled for rotation in suitable bearings 134 and 136. Bearing 134 is maintained in position between a retaining ring 138 and a shoulder 140 provided in housing 130. Bearing 136 is maintained in position between a shoulder 142 provided on shaft 132 and a lock washer 144 held in place by a locknut 146 threadably received on an externally threaded portion 148 of shaft 132. A circular saw blade 150 is mounted on a reduced diameter stem portion 152 of shaft 132 adjacent the forward end thereof between a rear flange member 154 threadably received on a threaded portion 156 of shaft 132 adjacent bearing 134 and a front flange member 160 mounted on said reduced diameter stem portion 152. The flanges have radial bearing surfaces 162 and 164, respectively, that engage the opposite radial side faces of saw blade 150. The forward end of stem portion 152 is provided with external threads 166 for receiving a nut 168 bearing against front flange 160 which serves to releasably clamp the saw blade 150 between said flanges.

The saw blade 150 is preferably a thin bonded abrasive wheel that is capable of cutting hard, synthetic resin laminates, such as Formica* and Micarta*. The blade 150 may be as thin as 0.090 inches.

The rearward end of spindle shaft 132 is suitably secured to a conventional sheave 170 for rotation therewith. Endless belts 172 are entrained about the sheave 170 and a drive pulley 174 rigidly mounted on a power shaft 176 rotatably driven by an electric motor 178 rigidly secured to a plate 180, which in turn is connected to motor mounting plate 120 by means of a plurality of bolts 182.

Mounted on the spindle housing 130 is a saw blade guard 184 for confining the debris resulting from the cutting operation. A guard 186 shrouds the drive pulley mechanism for precluding dirt and grit from entering thereinto.

Figure 6:
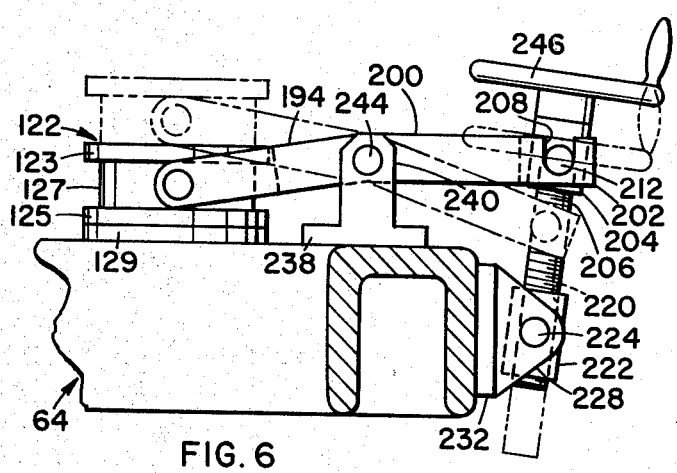
FIG. 6 is a fragmentary view, partially in section, of the means for raising and lowering the saw blade along the line 6–6 of FIG. 5.

Means are provided for raising and lowering saw blade 150, such means comprising a yoke member generally indicated at 190, in FIGS. 5 and 6 having a pair of arcuately shaped arms 192 and 194 at one end thereof which partially surround collar 122. A pair of rollers 196 and 198 are rotatably mounted adjacent the free ends of arms 192 and 194, respectively, by any suitable means and ride in the groove 127 of collar 122 to facilitate relative rotary movement between the collar 122 and yoke member 190.

An elongated arm 200 extends outwardly from the bight portion of yoke member 190 and is provided with a yoke 202 at its free end encasing a pivot block 204 threadably secured to an externally threaded screw shaft 206 extending downwardly therefrom. Yoke 202 is provided with grooves 208 and 210 on either side of block 204 for receiving extension pins 212 and 214, respectively, extending outwardly from the sides of block 204.

Screw shaft 206 is threadably received in a threaded bore 220 of a second pivot block 222 having extension pins 224 protruding outwardly from both sides of said block 222 and pivotally mounted between a pair of lugs 228, respectively, of a bracket 232 rigidly secured to carriage 64, as by means of welding for example.

Mounted on spindle housing 130 by means of suitable bolts 236 is a bracket 238 having a pair of spaced vertically extending lugs 240 and 242 suitably bored to receive an elongated shaft 244 on which arm 200 is mounted for pivotal movement. A handwheel 246 is keyed on screw shaft 206 adjacent the top end thereof for turning the same to pivot arm 200 about shaft 244 and effect raising or lowering of collar 122 and thereby saw blade 150 relative to the workpiece W.

Means are provided for rotating or swiveling shaft 112 and thereby saw blade 150 about the vertical axis of shaft 112. With reference to FIG. 7, such means comprises a guide block, generally designated 250, having an offset portion 252 rigidly secured in the groove 127 of collar 122, as by means of welding for example, and an elongated cylindrical extension 254 extending radially outwardly from said offset portion 252. An elongated, cylindrical, locating pin 256 parallel to shaft 112 is disposed within a bushing 258 for sliding movement longitudinally relative thereto, said bushing being secured within a bore 260 of extension 254. Locating pin 256 is provided with a transverse bore 262 for accommodating one end of a plunger shaft 264, the other end being provided with a control ball handle 266. Plunger shaft 264 is located in extension 254 and extends substantially perpendicular to a vertical plane cut through the longitudinal axis of locating pin 256.

Extension 254 is provided with a bore 268 which fits snugly about plunger shaft 264 and is counterbored as at 270 for containing a retaining ring 272, and a compression spring 274 which surrounds plunger shaft 264. Bore 268 is further provided with an internally threaded counterbore 276 for threadably receiving an externally threaded spring access plug 278 having a knurled hand-manipulated knob 280. It is readily apparent that spring 274 urges plunger shaft 264 into bore 262 of locating pin 256 and that a radial outwardly directed force exerted on ball handle 266 disengages shaft 264 from locating pin 256 to permit sliding movement of pin 256 relative to the guide block 250. A pair of cylindrical rods 282 and 284 extend outwardly from opposite sides of the upper portion of locating pin 256 and are provided with control ball handles 286 and 288, respectively, at their free ends for rotating collar 122 and shaft 112 relative to carriage 64. The rods 282 and 284 are received in slots 289 (FIG. 4) to align the transverse bore 262 with the plunger 264.

Sockets 290 and 292, spaced 90° from each other, are provided in the upper surface of carriage 64 for receiving locating pin 256 in alternate selected positions.

In operation, a workpiece W consisting of a core or backing B of wood or fibrous material and a laminate L of hard synthetic resin material, such as Formica* or Micarta*, is placed on the work support 14 and the lines on which the sections S are to be cut are marked on the upper surface of the workpiece. As shown in FIG. 1, the workpiece may be very long and wide and severed into discrete panels P (FIG. 11) after all the cuts have been made or alternatively, a single panel only, which will constitute the entire face or side of a finished cabinet, may be placed on the worktable. With the carriage 64 and saw blade 150 oriented in the position shown in FIG. 1, and with the saw blade 150 in its raised position, stop members 37 are adjusted along measuring bar 35 in accordance with the length of section desired to be cut and fixed in position as shown in FIG. 8. Lock mechanism 84 is released and carriage 64 is moved along shafts 34 and 36 until pointer 95 abuts one of the stop members 37. As shown in FIG. 8, pointers 95 and 97 indicate the leading edge of the saw blade in either cutting direction.

Power for rotating the saw blade 150 is provided by motor 178 through the pulley and belt-drive mechanism and spindle shaft 132. Screw shaft 206 is raised by turning handle 246 to allow collar 122 and the saw blade 150 to be lowered by gravity into engagement with the workpiece W. Before the saw blade engages the workpiece, locating pin 256 enters socket 290 and as the saw blade fully penetrates the workpiece, pin 256 falls into its locking position with the rods 286 and 288 being received in the slots 289 whereby plunger shaft 264 is inserted into the bore 262 of pin 256 to lock the same against vertical movement relative to collar 122. Saw blade 150 slightly penetrates work support 14, which is composed of any suitable soft wood or fibrous material, in order to insure that the blade completely cuts through the workpiece W.

The cutting operation is continued while moving carriage 64 along shafts 34 and 36 until pointer 97 abuts stop member 37 at which time the saw blade 150 is raised above the surface of the workpiece by turning screw shaft 206 in a direction to effect downward movement of screw shaft 206 in order to pivot arm 200 in a clockwise direction, thereby raising yoke member 190 and collar 122. Yoke member 190 is only raised a sufficient distance to elevate saw blade 150 above the surface of the workpiece without withdrawing locating pin 256 from aperture 290. The carriage is then moved along shafts 34 and 36 to the next section to be cut and the saw blade is maintained in alignment by means of locating pin 256 and socket 290 in the carriage 64. Of course, stop members 37 are moved and locked into position along measuring bar 35 for the next cutting operation. The cycle is repeated until all the cuts have been made along one line across the width of the workpiece as shown in FIG. 1.

The carriage is then moved longitudinally of the workpiece by loosening setscrews 47, sliding brackets 42 and 44 along tram rod 16 and 18, and resetting the setscrews 47 against said rods in preparation for making cuts parallel to the original cuts. This procedure is followed until the last transverse cuts are made adjacent the rear end of the workpiece.

In order to form cuts longitudinally of the workpiece, plunger shaft 264 is withdrawn from locating pin 256 to allow the same to be raised from socket 290. Collar 122, and thereby shaft 112 and saw blade 150 are then rotated 90° relative to carriage 64 by means of handles 286 and 288 into the position shown in phantom lines in FIG. 5. Locating pin 256 is then aligned with and dropped into aperture 292, thus setting up the apparatus for making cuts lengthwise of the workpiece in the same manner as the transverse cuts were made. Sections S may be formed in the above-described manner or they may be formed individually by swiveling the shaft 112 and saw blade 150 90° after each cut to form sections S one at a time.

With reference to FIG. 9, it will be seen that the penetration of the laminate along the plane of the saw blade meets the cut C accurately at right angles to form a 90° corner of the section S.

A portion of the backing B of section S below the laminate L at each corner remains integral with the adjacent backing B' of the sheet or workpiece W. Thus, the section S remains in place while hinges 300 as shown in FIG. 10, are applied along the front of section S prior to forming the final cuts along slot 302 at each corner from the back side of the section. Thus, the door formed by the section S is perfectly centered in the opening. Comparing the blades 150 and 150' of FIG. 9, it will be observed that with a smaller diameter blade, the amount of backing that must be cut through from the backside is decreased.

FIG. 11 illustrates one partially completed product, a sink cabinet by way of example, in which a panel P having cut sections S may be employed to form doors. It should be noted that the section S' cut out of the sink top is discarded in order to insert the conventional wash basin. Because of the waste involved in discarding the cut out sections of the front panel, such laminated composite structures were not previously used in the prior art for the front and side panels of finished cabinet products. However, the only waste resulting from applicant's sawing apparatus in forming panels P is the material removed from the slots 302, which is dependent on the width of the saw blade 150.

By way of example, a saw blade having a thickness of 0.090 inches would form a slot of the same thickness to provide the necessary clearance between the edges of the hinged doors formed of the sections S and the remaining portions of the panel P.

Although the sawing apparatus of the specific embodiment described above forms sections with 90° corners, it should be appreciated that the principles of this invention contemplate cutting sections having configurations which form various angled junctures. This can be effected by rotating shaft 112 through any desired arc and providing apertures 290 in carriage 64 in a corresponding position to lock said saw blade in the selected position.

As a result of the present invention, an improved saw apparatus is provided for forming sections in a laminated sheet in an improved and more efficient manner. By the provision of a circular saw blade pivotable about an axis lying in a plane perpendicular to the axis of the saw blade, cutout sections of various angular configurations can be formed from the laminated sheet. By the provision of a locating means, the cutting direction can be maintained in alignment to insure accurate linear cuts.

Another advantage residing in the apparatus of this invention is the provision of means for measuring the position of the blade edge when traveling in either direction in forming cutout sections to insure accurately cut corners of 90° or any other selected angle.

A preferred embodiment of the principles of this invention having been hereinbefore described and illustrated it is to be realized that modifications thereof can be made without departing from the broad spirit and scope of this invention as defined in the appended claims.

I claim:

1. A method of cutting openings having angular corners in a panel comprising: plunging a thin rotary saw blade through said panel from the front face at two longitudinally spaced locations and displacing said saw blade radially to cut a first pair of saw kerfs; turning said saw blade about an axis perpendicular to said panel face; plunging said saw blade through said panel from the front face at two transversely spaced locations and displacing said saw blade radially to cut a second pair of saw kerfs; said saw kerfs intersecting at four corners to define a panel section with a portion of said panel connecting opposite sides of said first and second saw kerfs at said corners; subsequently manipulating said panel; and severing said connecting portion whereby said panel section is suitable as a closure for said panel opening.

2. The method according to claim 1 wherein said manipulating includes applying hinges across one of said saw kerfs whereby said panel section becomes a door for said panel opening.

3. The method according to claim 1 wherein said panel includes a readily sawn backing and a hard sheet material superimposed on said backing at said front face, said saw blade having an abrasive cutting surface, said sheet material being entirely severed by said saw blade at said corners, prior to said manipulating step.